US007552909B2

(12) United States Patent
Ricco et al.

(10) Patent No.: US 7,552,909 B2
(45) Date of Patent: Jun. 30, 2009

(54) FUEL INJECTOR WITH ADJUSTABLE-METERING SERVO VALVE FOR AN INTERNAL-COMBUSTION ENGINE

(75) Inventors: Mario Ricco, Casamassima (IT); Adriano Gorgoglione, Valenzano (IT); Raffaele Ricco, Valenzano (IT); Antonio Gravina, Valenzano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 260 days.

(21) Appl. No.: 11/784,946

(22) Filed: Apr. 10, 2007

(65) Prior Publication Data

US 2007/0251498 A1 Nov. 1, 2007

(30) Foreign Application Priority Data

Apr. 11, 2006 (EP) ................................ 06425256

(51) Int. Cl.
*F16K 31/02* (2006.01)

(52) U.S. Cl. ........................... 251/129.18; 251/129.16; 239/533.2

(58) Field of Classification Search ............ 251/129.15, 251/129.16, 129.18; 239/127, 533.1, 533.2
See application file for complete search history.

(56) References Cited

U.S. PATENT DOCUMENTS 4,365,747 A 12/1982 Knapp et al. ................ 239/125
6,126,094 A * 10/2000 Ricco ...................... 239/585.1
6,161,774 A * 12/2000 Ricco ......................... 239/127
6,443,132 B1 * 9/2002 Ricco et al. ................. 123/467

FOREIGN PATENT DOCUMENTS

| | | |
|---|---|---|
| EP | 0450532 | 3/1991 |
| EP | 0890730 | 7/1998 |
| EP | 0905371 | 3/1999 |
| EP | 0916843 | 5/1999 |
| EP | 1219828 | 7/2002 |
| GB | 2378985 | 2/2003 |
| WO | WO96/41947 | 12/1996 |

OTHER PUBLICATIONS

European Search Report dated Oct. 2, 2006 based on European Application No. EP06425256.

* cited by examiner

*Primary Examiner*—John K Fristoe, Jr.
(74) *Attorney, Agent, or Firm*—Ohlandt, Greeley, Ruggiero & Perle, L.L.P.

(57) ABSTRACT

An injector with an adjustable-metering servo valve is provided. The injector has a shutter actuated by an armature of an electromagnet. The armature is mobile for an opening stroke defined by a surface of the core of the electromagnet, which is fixed in the casing by a ring nut and a hollow support of the core. The hollow support has a first contact surface that acts on a flange of the core. Set between the surface and a shoulder of the casing is a shim. An annular projection, having a second contact surface, is set between the surface and a shoulder of the casing. The second contact surface is contained at least in part in the area corresponding to the first contact surface so that the stroke of the armature is adjusted by plastic deformation of the shim or of the surface of the core.

17 Claims, 3 Drawing Sheets

FUEL INJECTOR WITH ADJUSTABLE-METERING SERVO VALVE FOR AN INTERNAL-COMBUSTION ENGINE

CROSS REFERENCE TO RELATED APPLICATIONS

This application claims benefit under 35 U.S.C. § 119(a) of European Patent Application No. 06425256.2, filed Apr. 11, 2006, the entire contents of which are incorporated herein by reference.

BACKGROUND OF THE INVENTION

1. Field of the Invention

The present disclosure relates to a fuel injector with adjustable-metering servo valve for an internal-combustion engine.

2. Description of Related Art

As is known, the servo valve of an injector in general comprises a control chamber of the usual control rod of the nozzle of the injector. The control chamber is provided with an inlet hole in communication with a pipe for the fuel under pressure and a calibrated hole for outlet or discharge of the fuel, which is normally closed by a shutter controlled by the armature of an electromagnet. The stroke or lift of the armature determines the readiness of the response of the servo valve both for opening and for closing so that it should be as small as possible. Said stroke also determines the section of passage of the fuel through the discharge hole, so that it should to be as wide as possible within the limits of the section of the outlet hole of the control chamber. Consequently, it is necessary to adjust the stroke of the armature and/or of the shutter accurately.

Servo valves are known with the shutter separated from the armature, the stroke of which is defined on one side by the arrest against the shutter in a position for closing the discharge hole. In a known servo valve, the armature is guided by a sleeve, one end of which forms the element for arrest of the stroke of the armature in the direction of the core of the electromagnet. The sleeve is in turn fixed in a cavity of the casing in a position, with respect to the valve body, such as to define the range of the stroke of the armature for opening of the discharge hole. The adjustment of the stroke of the armature is obtained by using at least one removable shim, set between the sleeve and the core of the electromagnet, in order to define the stroke of the armature, and at least another removable shim set between the sleeve and the valve body in order to define the gap of the armature.

The aforesaid shims can be chosen from among classes of calibrated and modular shims. For technological reasons and for economic constraints of feasibility, said shims can vary from one another by an amount not less than the machining tolerance, for example 5 micrometers (μm). The operation of adjustment of the stroke of the armature by discrete amounts with a tolerance of 5 μm is, however, relatively rough, so that it is often impossible to keep the flow rate of the injector within the very narrow limits required by modern internal-combustion engines. Consequently, the operation of adjustment is complicated, requiring different successive attempts of approximation, each of which involves dismantling and the re-assembly of part of the injector. In any case, adjustment on the one hand requires a considerable amount of time on the part of a skilled operator, and on the other hand is often imperfect on account of the aforesaid discrete amounts.

Also known from the document EP-A-0 890 730 is a servo valve, in which the sleeve for guiding the armature is provided with a flange that is relatively deformable to bending loads. The same sleeve is moreover provided with a thread for fixing it in the cavity of the casing, independently of the valve body. The position of the flange is adjusted, by means of shims, in discrete positions of a given interval, for example 5 μm. Subsequently, by screwing the sleeve by applying a calibrated tightening torque, the flange is deformed so as to enable a fine adjustment to be made.

In the known servo valves described above, the shutter is subjected on the one hand to the axial thrust exerted by the pressure of the fuel in the control chamber and on the other hand to the action of the axial thrust of a spring that is pre-loaded so as to overcome the thrust of the pressure when the electromagnet is not excited. The spring then presents characteristics and dimensions such as to be able to exert a considerable axial thrust, for example in the region of 70 Newtons (N) for a pressure of the fuel of 1800 bar. Upon excitation of the electromagnet, the armature is displaced and comes to stop against a fixed element, in a position such as to enable a residual minimal gap with respect to the core of the electromagnet, in order to optimize prompt reaction of the servo valve to de-excitation of the electromagnet.

In order to reduce pre-loading of the spring for closing the shutter, a servo valve has recently been proposed, in which the fuel under pressure no longer exerts an axial action, but acts in a radial direction on the support of the shutter, so that the action of the pressure of the fuel on the shutter is substantially balanced. The action of the spring and that of the electromagnet can thus be of a lower value. Also in this known servo valve, it has been proposed to adjust the stroke of the armature by means of one or more shims, set between a flange of the core of the electromagnet and a shoulder of the casing of the injector. Installation of the shims requires, however, a relatively long time, so that the injector is rather costly to make.

BRIEF SUMMARY OF THE INVENTION

The aim of the disclosure is to provide a fuel injector with adjustable-metering servo valve, which will present high reliability and limited cost, eliminating the drawbacks of the adjustment obtained according to the known art.

BRIEF DESCRIPTION OF THE SEVERAL VIEWS OF THE DRAWINGS

For a better understanding of the disclosure two preferred embodiments are described herein by way of example, with the aid of the annexed plate of drawings, wherein.

DETAILED DESCRIPTION OF THE INVENTION

Figure 1:
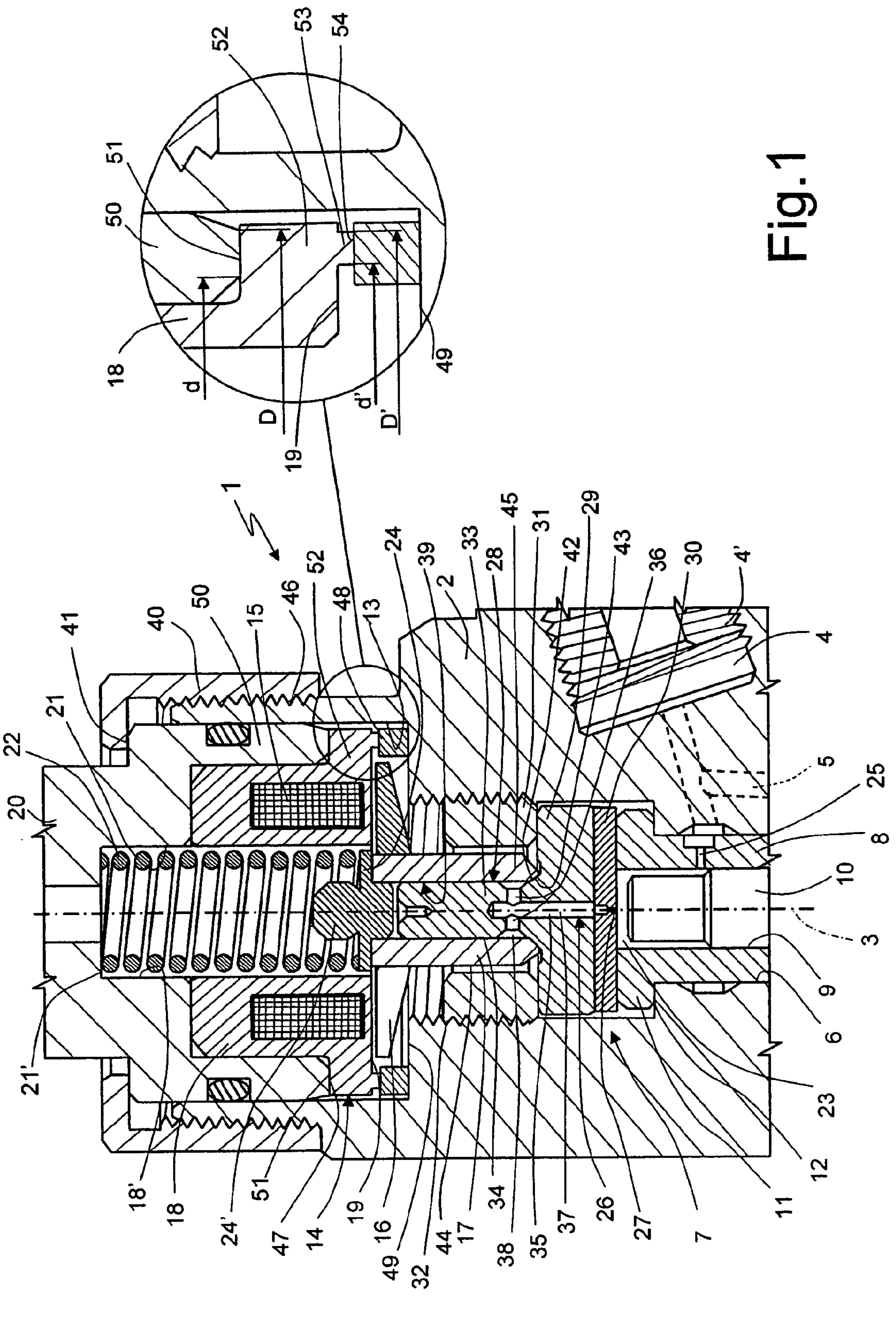
FIG. 1 is a partial cross-sectional view of a fuel injector provided with an adjustable-metering servo valve according to a first embodiment of the disclosure.

With reference to FIG. 1, number 1 designates as a whole a fuel injector (partially illustrated), for an internal-combustion engine, in particular, a diesel engine. The injector 1 comprises a hollow body or casing 2, which extends along a longitudinal axis 3, and has a lateral inlet 4 designed to be connected to a pipe 4' for delivery of the fuel at a high pressure, for example at a pressure in the region of 1800 bar. The casing 2 terminates with a nozzle (not illustrated) communicating with the inlet 4 through a pipe 5 and designed to inject the fuel into a corresponding cylinder of the engine.

The casing 2 has an axial cavity 6, housed in which is a metering servo valve 7 comprising a valve body 8. The body 8 has an axial hole 9 in which a control rod 10 is able to slide in a fluid-tight way. The body 8 moreover has a flange 11 normally resting against a shoulder 12 of the cavity 6. The control rod 10 is designed to control a shutter needle (not illustrated) for opening and closing the fuel-injection nozzle, as will be seen in greater detail in what follows.

The casing 2 is provided with another cavity 13, which also shares the axis 3, housed in which is an actuator device 14, comprising an electromagnet 15. This is designed to control a notched-disk armature 16, which is fixed to a sleeve 17. The electromagnet 15 is formed by a magnetic core 18, having a polar surface 19 perpendicular to the axis 3. The electromagnet 15 is kept in position by a support 20 in a way that will emerge more clearly from what follows.

The magnetic core 18 is provided with a cavity 18' set in the area corresponding to a similar cavity 21 of the support 20. The two cavities 18' and 21 also share the same axis 3, and house a helical compression spring 22, pre-loaded so as to exert a thrust on the armature 16 in a direction opposite to the attraction exerted by the electromagnet 15. In particular, the spring 22 has one end resting against an internal shoulder 21' of the support 20 and another end acting on the armature 16 through a washer 24, which comprises a block 24' for guiding the end of the spring 22.

The servo valve 7 comprises a control chamber 23, which, through a passage 25 of the body 8, communicates permanently with the inlet 4 to receive the fuel under pressure. The control chamber 23 is delimited axially on one side by the rod 10 and on the other by an end disk 30 in contact with the flange 11 of the body 8. The control chamber 23 also has an outlet or discharge passage of the fuel, designated as a whole by 26. The passage 26 is symmetrical with respect to the axis 3 and comprises a discharge hole 27 with calibrated cross section, made in the disk 30 along the axis 3. The passage 26 moreover comprises a distribution stretch 35 made in a body 28 for guiding the armature 16, which is set between the disk 30 and the actuator 14.

The body 28 comprises a base 29 axially tightened by means of a threaded ring nut 31, screwed on an internal thread 32 of the casing 2. In particular, the base 29 of the body 28 is set in the cavity 6 and is pack tightened in a position fixed with respect to the disk 30 and the flange 11 and in a fluid-tight way so as to bear axially upon the shoulder 12. Furthermore, the body 28 comprises a pin or stem 33, which extends in cantilever fashion from the base 29 along the axis 3 in a direction opposite to the chamber 23. The pin 33 is delimited on the outside by a cylindrical lateral surface 34, designed to guide the sleeve 17 of the armature 16 axially.

The stem 33 is made of a single piece with the base 29, and has two radial holes 36, diametrally opposite to one another and in communication with an axial portion 37 of the distribution stretch 35 of the passage 26, so that they are fluid-tight in communication with the calibrated hole 27. The holes 36 give out from the stem 33, in an axial position adjacent to the base 29. Made along the lateral surface 34 of the stem 33, in the area corresponding to the holes 36, is an annular chamber 38. The sleeve 17 also has an internal cylindrical surface 39, fitted to the lateral surface 34 of the stem 33 substantially in a fluid-tight way, with calibrated diametral play, for example less than 4 μm. Alternatively, the fluid-tight fit between the sleeve 17 and the stem 33 can be obtained by interposition of seal elements.

The sleeve 17 is designed to slide axially along the surface 34, between an advanced end-of-travel position and a retracted end-of-travel position. The advanced end-of-travel position, represented in FIG. 1, is such as to close the passage 26, and is defined by the bearing arrest of an own conical end 42 upon a conical shoulder 43 of the body 28. The retracted end-of-travel position is such as to open completely the radial holes 36 of the passage 26, and is defined by the arrest of the armature 16 upon the polar surface 19 of the core 18.

It is to be noted that, in the advanced end-of-travel position, the fuel exerts a zero resultant of axial thrust on the sleeve 17, given that the pressure in the chamber 23 acts radially on the surface 34, whereas, in the retracted end-of-travel position, the fuel flows from the radial holes 36 to a discharge or recirculation channel (not illustrated), through an annular passage 44 between the ring nut 31 and the sleeve 17, the notches of the armature 16, and the cavity 18' of the core 18 and 21 of the support 20.

The annular chamber 38 is designed to be opened and closed by a shutter 45, defined by a bottom portion of the sleeve 17, adjacent to the end 42, so that the shutter 45 is actuated together with the armature 16 when the electromagnet 15 is energized. In particular, the armature 16 displaces towards the core 18 so as to open the servo valve 7, causing discharge of the fuel and hence a drop in the pressure of the fuel in the control chamber 23. In this way, an axial translation of the rod 10 is brought about, which controls opening and closing of the injection nozzle. De-energization of the electromagnet 15 causes the spring 22 to bring the armature 16 back into the position of FIG. 1 so that the shutter 45 recloses the passage 26 and hence the servo valve 7.

The core 18 of the electromagnet 15 is fixed in the compartment 13 of the casing 2 by means of a threaded ring nut 40, which engages an annular shoulder 41 of the support 20. This support 20 comprises a hollow portion 50 in which the core 18 is housed, and an annular contact surface 51, having a pre-set area defined by an external diameter D and an internal diameter d. The lateral surface of the hollow portion 20' of the support 20 is set in a fluid-tight way in the cavity 13 of the casing 2.

The core 18 of the electromagnet 15 is provided with a flange 52 that forms an annular shoulder 47, acting on which is the annular contact surface 51 of the hollow portion 50. In order to determine the stroke of the shutter 45 in the direction of the core 18, set between the polar surface 19 of the core 18 and an annular shoulder 49 of the compartment 13 of the casing 2 is at least one annular shim 48 sharing the axis 3.

According to the disclosure, the shim 48 is made of a material having a hardness different from that of the material of the core 18 of the actuator 14 or of the casing 2 so as to cause a pre-set plastic deformation according to the tightening torque of the ring nut 40 such as to guarantee the desired position for the core 18. According to the first embodiment of the disclosure illustrated in FIGS. 1 and 2, the shim is made of a material having an adequate stiffness greater than that of the material of the core 18. Whereas the core 18 can be made of soft iron (for example, $FeSi_3$ with a Brinell hardness $HB \leqq 100$), the shim 48 can be made of steel or cast iron (for example, thermally treated C40 steel with a Brinell hardness HB=240).

Set moreover between the flange 52 and the shoulder 49 is an annular projection 53 having a contact surface 54 defined by an internal diameter D' and an external diameter d', which is contained at least in part in the contact surface 51 of the hollow portion 50', in such a way that the flange 52 will discharge, directly on the shim 48, the axial action of the tightening torque of the ring nut 40.

According to the variant of FIG. 1 of the first embodiment, the projection 53 is made of a single piece with the core 18. The projection 53 is preferably set in the area corresponding to the width of the flange 52 and hence to the width of the annular surface 51 of the hollow portion 50. The projection 53 can also be set in such a way that its external diameter D' is comprised between the two diameters D and d of the annular surface 50, whilst the internal diameter d' is smaller than or equal to the internal diameter d of the annular surface 50. Of course, the shim 48 will have dimensions such as to engage in any case the entire surface of the projection 53. By way of example, the width D-d of the annular surface 50 can be comprised between 3 and 5 mm, whereas the width D'-d' can be in the region of between 0.25 and 0.75 of the width of the annular surface 50. The ring nut 40 is designed to be screwed with a tightening torque of, for example, between 15 and 25 N·m. This torque determines, within said limits, a corresponding axial tightening load, such as to guarantee a plastic variation of the projection 53, or reduction in height, of between 10 and 15 μm.

Figure 2:
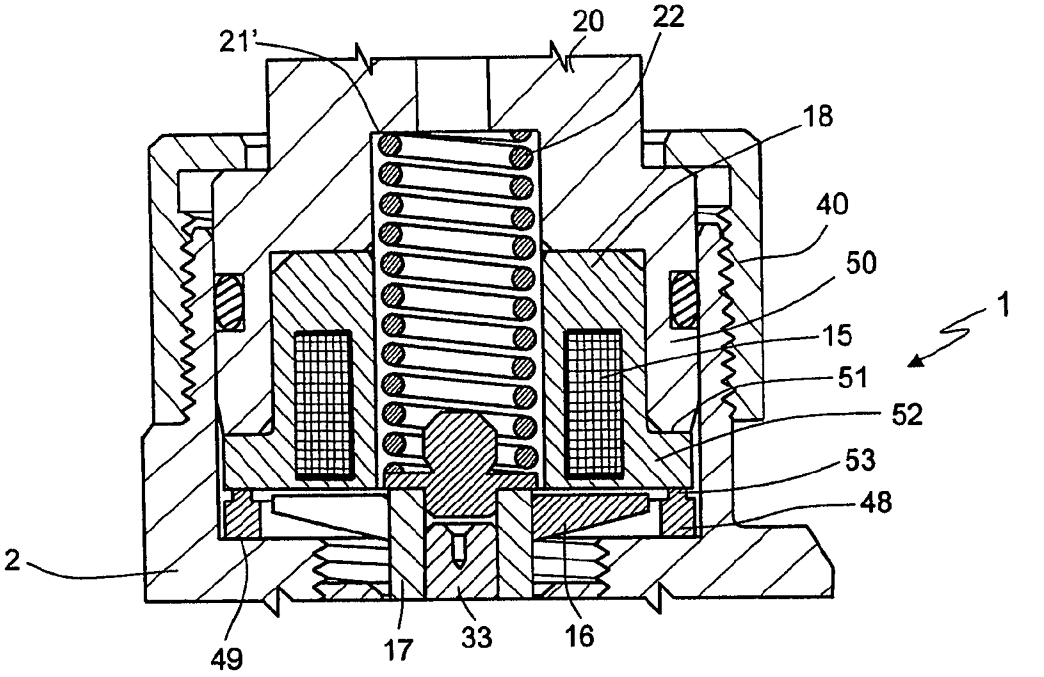
FIG. 2 is a detail of a variant of the servo valve of the embodiment of FIG. 1.

According to the variant of FIG. 2, the projection 53 is made of a single piece with a corresponding shim 48 and is directed towards the core 18. The projection 53 has dimensions equal to those of the variant of FIG. 1 and is set substantially in the same relative position with respect to the annular surface 51. Since the shim 48 is also made of a material having a hardness greater than that of the core 18, the axial load, determined by the tightening torque, now plastically deforms the surface 19 of the core 18.

Figure 3:
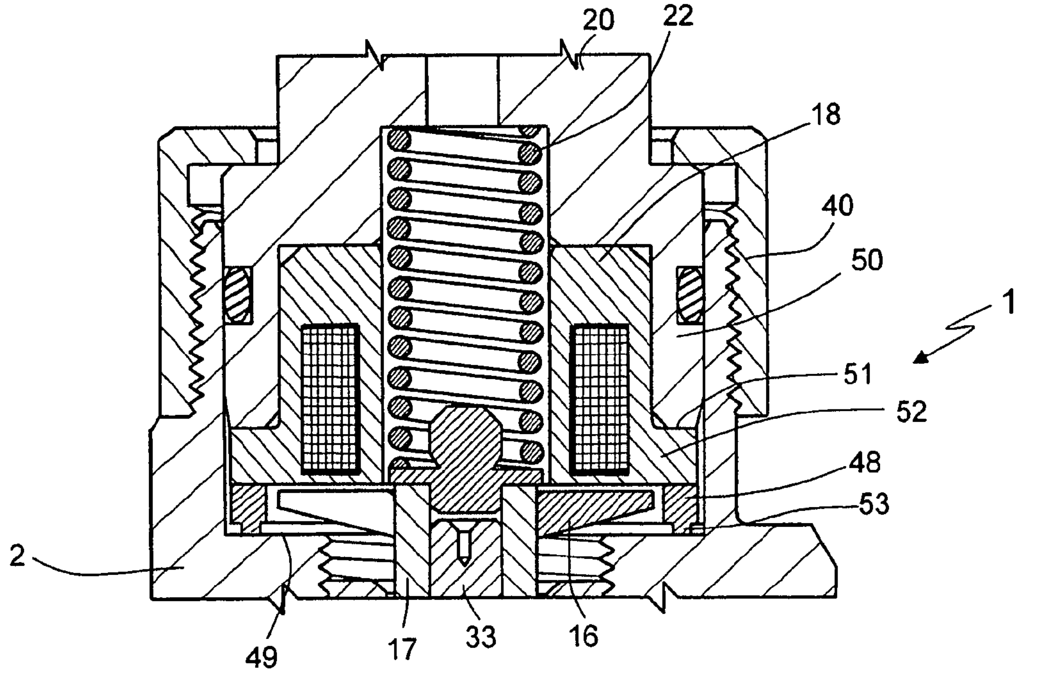
FIG. 3 is the detail of the servo valve of FIG. 2, in a second embodiment of the disclosure.
Figure 4:
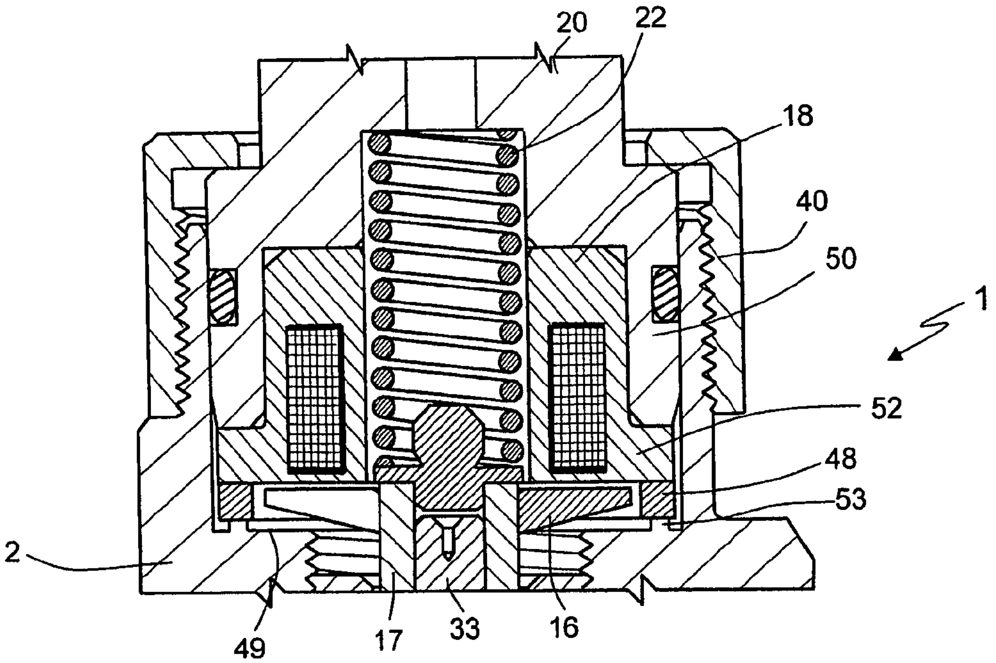
FIG. 4 is the detail of a variant of the servo valve of the embodiment of FIG. 3.

In the second embodiment of FIGS. 3 and 4, the casing 2 is made of a relatively hard material, for example, C45 steel thermally treated so as to achieve a surface hardness HB=240. The shim 48 can be made of a material softer than that of the casing 2, for example, C10 steel with a Brinell hardness HB≦130 so that the axial load, determined by the tightening torque, plastically deforms the shim 48.

According to the variant of FIG. 3 of the second embodiment, the projection 53 is made of a single piece with the shim 48 and is directed towards the shoulder 49 of the compartment 13 of the casing 2. The projection 53 has the same dimensions as that of the variant of FIG. 2 and is substantially set in the same position with respect to the annular surface 51. In this case, the plastic deformation is obtained on the projection 53.

In the variant of FIG. 4 of the second embodiment, the projection 53 is made of a single piece with the shoulder 49, has the same dimensions as that of the variant of FIG. 3 and is set substantially in the position with respect to the annular surface 51. In this variant the axial load, determined by the tightening torque, plastically deforms the shim 48.

Figure 5:
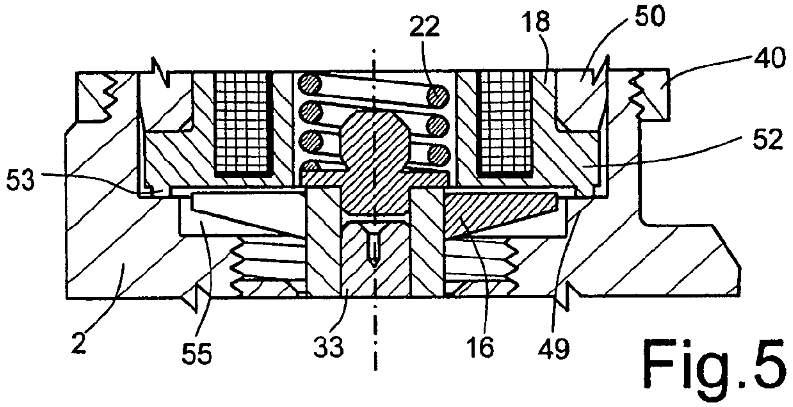
FIG. 5 is the detail of the servo valve of FIG. 2, in a third embodiment of the disclosure.
Figure 6:
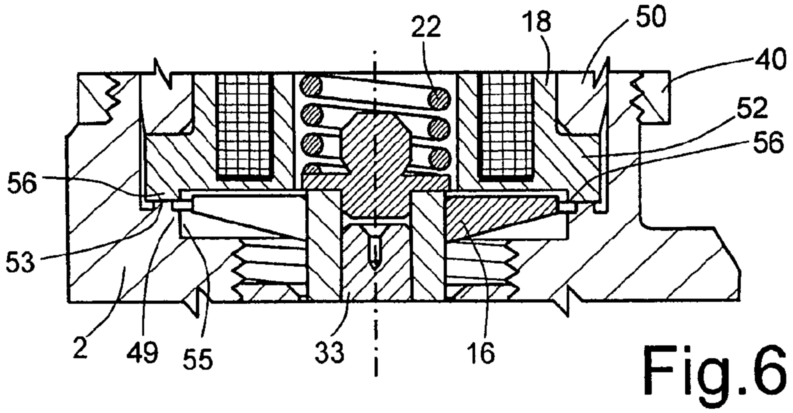
FIG. 6 is the detail of a variant of the servo valve of the embodiment of FIG. 5.

According to the third embodiment of FIGS. 5 and 6, since the core 18 is in general made of a material softer than that of the casing 2, the shim 48 can be omitted. In particular, according to the variant of FIG. 5, the projection 53 is made of a single piece with the flange 53 of the core 18 as in FIG. 1, and is designed to be deformed plastically by the axial thrust determined by the tightening torque of the ring nut 40. Advantageously, in this case the shoulder 49 of the compartment 13 is provided with an undercut 55 to enable the stroke of the armature 16.

Instead, according to the variant of FIG. 6 of the third embodiment, the projection 53 is made of a single piece with the casing 2 as in FIG. 3, and is designed to deform the surface 19 of the flange 47 plastically by the axial thrust determined by the tightening torque of the ring nut 40. Advantageously, in this case, the shoulder 49 of the compartment 13 can also be provided with an undercut 55 to enable the stroke of the armature 16. In addition, or alternatively, the flange 52 can be provided with a ribbing 56 such as to define a deformable surface 19 distinct from the polar surface 19' of the core 18.

From a practical standpoint, since the plastic deformation of the projection 53 (FIGS. 1 and 3), or else of the deformable surface 19 of the core 18 (FIGS. 2 and 4), is always relatively limited, it could be advisable to provide a magazine of shims 48, of modular dimensions, i.e., divided in classes of thickness. Advantageously, in all of the embodiments described just one shim 48 may at the most be used and may be coupled to one or more additional rigid shims, which can be calibrated and of modular dimensions and can be chosen so as to reduce to a minimum the plastic deformation of the projection 53 or of the surface 19 of the core 18 or of the surface of the shim 48. In particular, the additional modular shims are essential in the case of the variants of FIGS. 5 and 6.

Consequently, it is clear that, in all the cases described above, the adjustment of the stroke of the armature 16 is obtained by providing in the compartment 13 at least one projection 48, together with one or more stiff modular shims, in such a way that, with a pre-set tightening torque of the ring nut 40, fine adjustment by successive approximations is obtained, for example by rotating each time the ring nut 40 through a pre-set angle.

From what has been seen above, there emerge clearly the advantages of the injector with an adjustable-metering servo valve according to the disclosure as compared to the known art. In the first place, it is possible to obtain a continuous adjustment with maximum precision for the stroke of the armature 16. Furthermore, the need for various classes of modular shims is reduced to the minimum or eliminated altogether. The need for a high precision of machining both of the shims 48 and of the additional stiff shims, which concur in determining the lift of the armature, is also reduced, as likewise the need for a high precision of machining of the casing, of the magnetic core and the entire servo valve 7. Also eliminated is the need for software compensation by the electronic control unit of any possible differences between the injectors. Finally, thanks to the balanced shutter 45, on the one hand it is possible to use as arrest of the armature 16 directly the polar surface 19, and on the other hand the axial load to be generated on the projection 48 to obtain the desired variations in dimensions is reduced.

It is understood that various modifications and improvements can be made to the injectors with adjustable-metering servo valve described above without departing from the scope of the claims. For example, the projection 48 can have a cross section other than the rectangular one described and illustrated, in particular a trapezial cross section. Furthermore, the end disk 30 of the valve body 8 can also be made of a single piece with the latter, and the armature 16 can be provided with a thin layer of non-magnetic material functioning as gap. Finally, the actuator 14 can be of a different type, for example, of a piezoelectric type.

What is claimed is:

1. A fuel injector with adjustable-metering servo valve for an internal-combustion engine, comprising:

a casing housing the servo valve and an actuator having a mobile member for controlling a shutter of the servo valve and an element of arrest for defining an opening stroke of said mobile member, said element of arrest being fixed in said casing by a threaded member acting on a hollow body provided with a first annular surface of contact with said actuator;

at least one shim being set between said element of arrest and a portion of said casing, said threaded member being screwed with a pre-set tightening torque on a thread of said casing so as to determine a corresponding tightening load on said least one shim, wherein said at least one shim is formed with a material having a hardness different from that of the material of said element of arrest or of said casing;

an annular projection having a second annular contact surface being provided between said element of arrest and said casing, said second contact surface being contained, at least in part, in the area corresponding to said first contact surface so as to adjust said opening stroke of said mobile member by a pre-set plastic deformation of said least one shim or said element of arrest as a function of said tightening torque.

2. The injector according to claim 1, wherein said shutter is controlled by an armature of an electromagnet having a core provided with a flange, said threaded member being formed by a ring nut acting on said flange, and wherein said least one shim is set between said flange and a shoulder of said casing.

3. The injector according to claim 2, wherein that said least one shim is formed with a material having a hardness greater than that of said flange so that said plastic deformation is obtained on said flange.

4. The injector according to claim 3, wherein said annular projection is made of a single piece with said flange so that said plastic deformation is obtained on said annular projection.

5. The injector according to claim 3, wherein said annular projection is made of a single piece with said at least one shim so that said plastic deformation is obtained on said flange.

6. The injector according to claim 2, wherein said least one shim is formed with a material having a hardness lower than that of said casing so that said plastic deformation is obtained on said at least one shim.

7. The injector according to claim 6, wherein said annular projection is made of a single piece with said at least one shim so that said plastic deformation is obtained on said annular projection.

8. The injector according to claim 6, wherein that said annular projection is made of a single piece with said shoulder so that said plastic deformation is obtained on said at least one shim.

9. The injector according to claim 2, wherein said core is formed with a material having a hardness lower than that of said casing, said annular projection being set directly between said flange and said shoulder.

10. The injector according to claim 9, wherein said annular projection is made of a single piece with said flange so that said plastic deformation is obtained on said annular projection.

11. The injector according to claim 10, wherein said annular projection is made of a single piece with said shoulder so that said plastic deformation is obtained on said flange.

12. The injector according to claim 2, where said first annular surface has a first external diameter and a first internal diameter, and wherein said projection has a rectangular or trapezial cross section, said second annular surface having a second external diameter between said first external and internal diameters of said first annular surface.

13. The injector according to claim 12, wherein said second annular surface has a second internal diameter that is between said first external and internal diameters of said first annular surface.

14. The injector according to claim 12, wherein said second internal diameter is not greater than said first internal diameter.

15. The injector according to claim 2, wherein said at least one shim comprises a plurality of calibrated shims or a plurality of modular shims.

16. The injector according to claim 2, further comprising a control chamber in communication with a discharge passage, wherein said shutter is formed by a sleeve fixed to said armature, said sleeve being able to slide on a stem having at least one radial hole of said discharge passage.

17. The injector according to claim 16, wherein said stem is carried by a guide body having a conical shoulder of arrest for a closing stroke of said armature, said sleeve comprising one end designed to come to stop against said conical shoulder.

* * * * *